3,237,598
SPRAY SYSTEM INCLUDING NOZZLE OSCILLATING THROUGH HELICAL PATH
Erwin A. Zahn, Evansville, Ind., assignor to George Koch Sons, Inc., Evansville, Ind., a corporation of Indiana
Filed Oct. 17, 1960, Ser. No. 64,668
6 Claims. (Cl. 118—315)

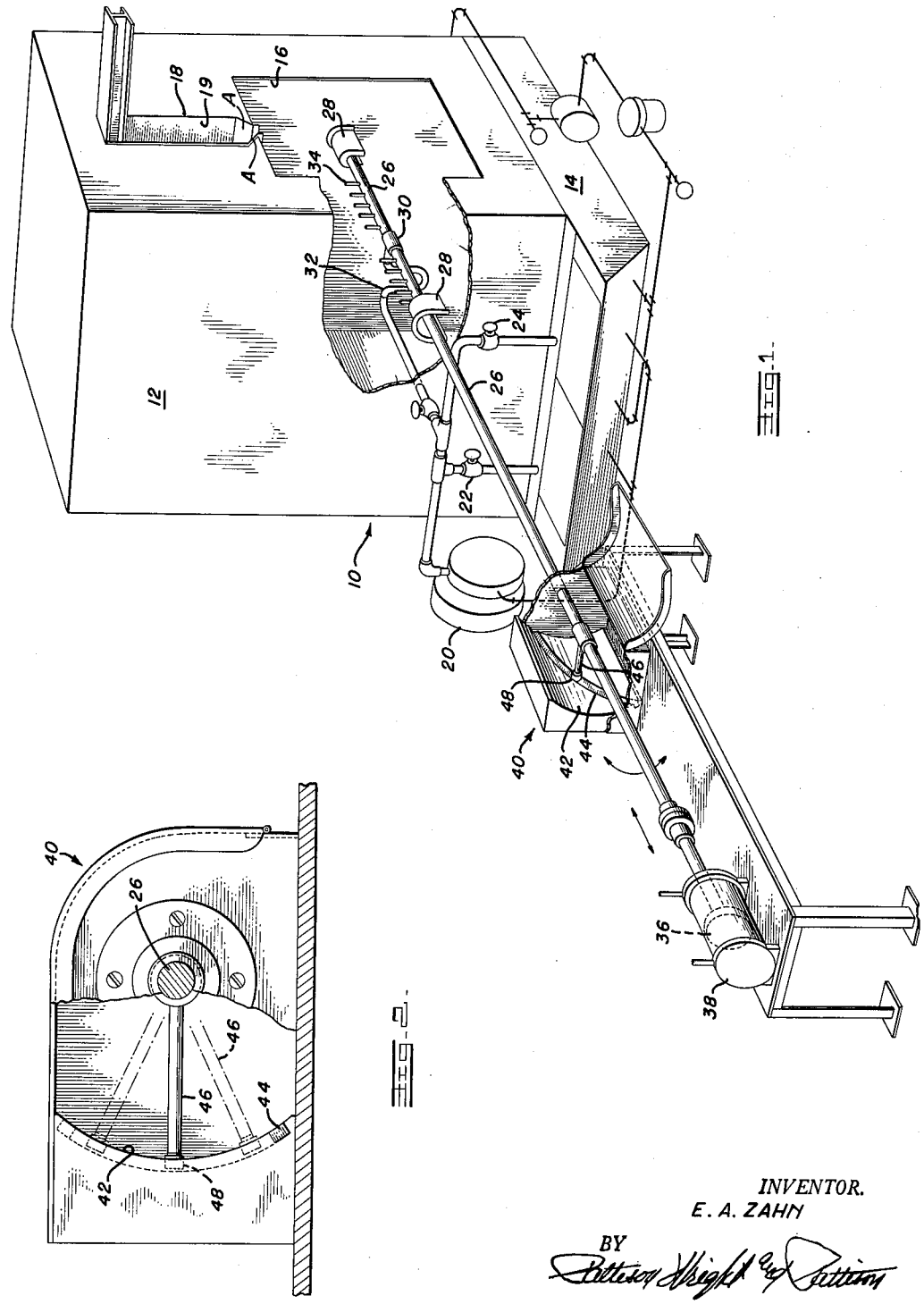

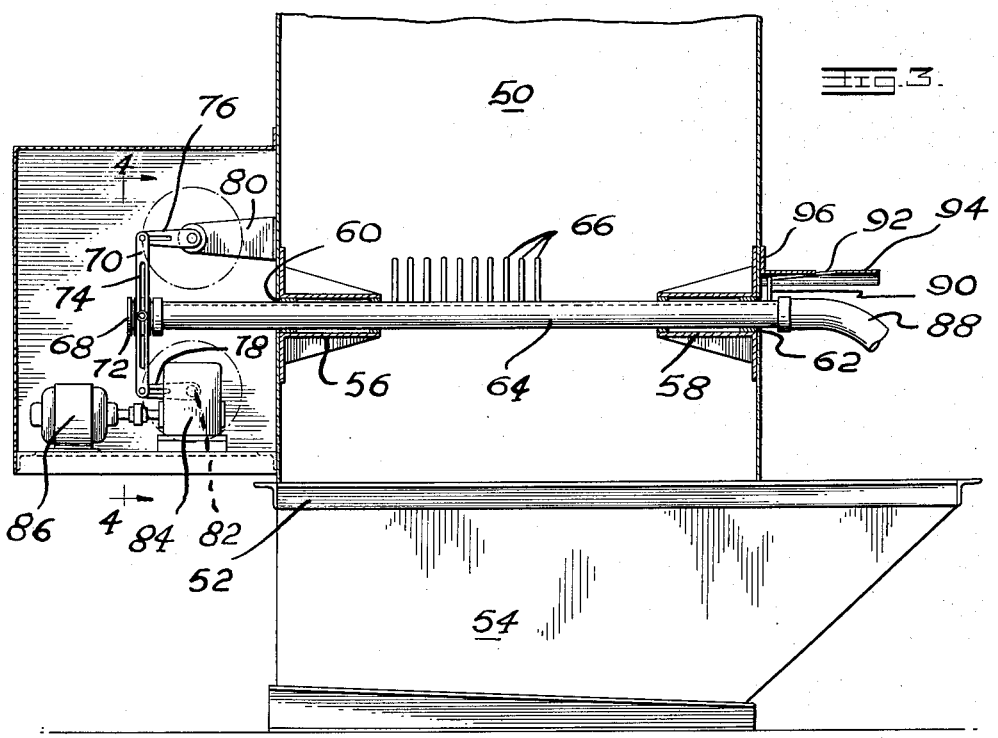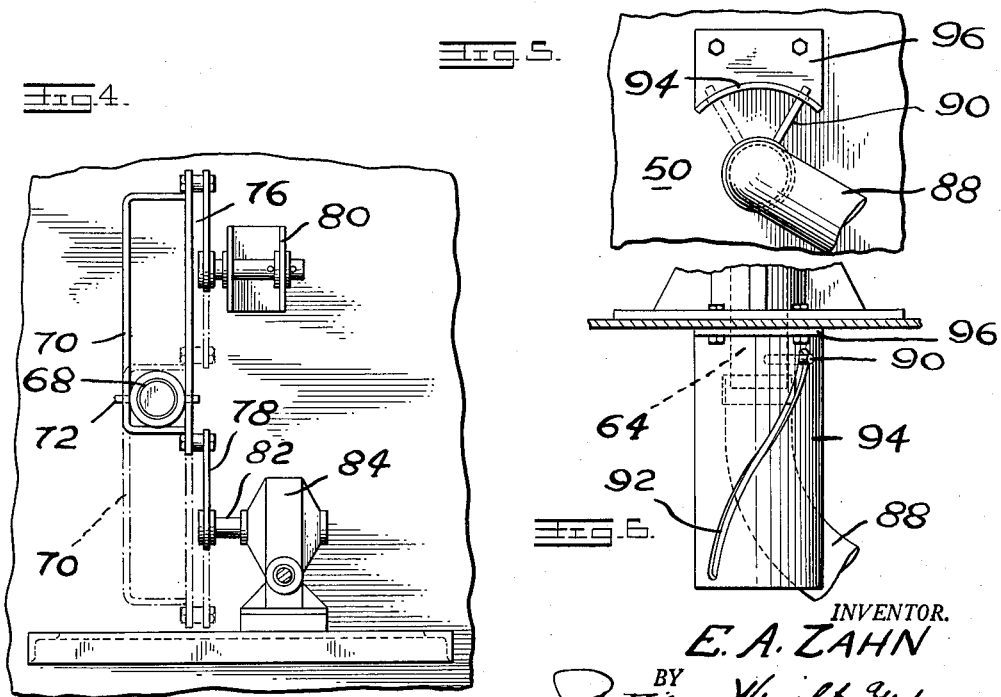

This application is a continuation-in-part of my copending application, Serial No. 834,891, filed August 19, 1959 and now abandoned.

This invention relates to paint application and more particularly and specifically to an improved and novel apparatus for industrial flow-coat paint application.

It is generally recognized that there are four classes of industrial paint application, namely, atomization, roller, dip, and flow. Further, the general class of flow application has come from practice to be divided into three sub-classes, namely, spinning, high-pressure, and low-pressure.

The spinning method of flow coat application involves the use of shaped nozzles which spin under high pressure fluid flow. By this method the paint is atomized to a limited degree by reason of the high pressure behind the application, and the method is considered generally inefficient because interior areas within an article are difficult to coat and because of a recognized high rate of solvent loss incident to practice of this method.

In the high-pressure flow coat system, stationary spaced nozzles are employed for distributing paint under high pressure onto articles to be coated. Practice of this method results in the accumulation of high pump heat in the coating material or paint, thereby requiring an excessive thinning of the paint for proper application. Further, because of the high pump pressure and excessive thinning requirements, atomization of the paint occurs and interiors of articles cannot be efficiently or effectively coated.

Low pressure flow coating processes involve the use of stationary, unshaped nozzles for distribution of paint. To obtain effective coverage by this method a large number of nozzles are required and a high pump volume must be maintained at all times. However, this method will accommodate higher paint solids application thereby maintaining solvent loss at a minimum. The low pressure flow coat method has become the most popular in present day industry because more effective and efficient results are obtained by reason of greater film adhesion and film density acquired by reason of thorough surface wetting and high solids application, both inherent in this method.

It is a general object of this invention to provide a novel apparatus for flow coat painting which takes full advantage of the benefits inherent in low pressure flow coat methods while at the same time eliminating certain disadvantages of flow coat methods, such as high volume pump requirements, high tank capacity and excessive piping, which have been recognized to exist heretofore.

It is a principal object of this invention to provide an apparatus for industrial paint application which includes a feed or flow pipe having a limited number of nozzles spaced therealong which are reciprocated and oscillated to produce low pressure flowing streams of paint divergently directed relative to work pieces within a coating chamber.

Another object of this invention lies in the provision of apparatus for low pressure flow coating which provides for efficient and effective paint coverage of an article to be coated with utilization in the apparatus of a minimum number of coating nozzles and a pump of nominal pressure and capacity.

A further object of this invention is the provision of low pressure flow coating apparatus wherein an article to be coated is passed in a path through a coating chamber and low pressure streams of coating material are directed in arcuate paths onto the article obliquely to the path of its passage through the coating chamber.

Still another object of this invention is the provision of flow coat apparatus which permits of extremely low cost installation and operation and which provides for minimum cleaning and flushing requirements in order to change over from one coating composition or material to another.

Still further objects and advantages of the present invention will become more readily apparent to those skilled in the art when the following description is read in the light of the accompanying drawings.

The nature of the present invention may be stated in general terms as relating to an apparatus for flow coating articles of irregular shape and of three or more dimensions. The apparatus contemplated by this invention includes a coating chamber, coating composition feed piping extending into said chamber, means for moving articles to be coated into and out of said chamber, nozzle means arranged in said feed piping, and means for simultaneously reciprocating said feed piping while oscillating it through a fixed helix.

Referring now to the accompanying drawings in which like numerals designate similar parts throughout the several views:

FIG. 1 is a perspective view broken away in part, and in part schematic, illustrating the novel apparatus of this invention.

FIG. 2 is a fragmentary sectional elevation of the cam means for including nozzle oscillation.

FIG. 3 is a side elevation in partial vertical section illustrating a modified form of the apparatus of this invention.

FIG. 4 is a vertical section taken on line 4—4, FIG 3.

FIG. 5 is an end elevation of the rotation control bracket and spray pipe.

FIG. 6 is a top view of the components of FIG 5.

The flow coat apparatus constituting the present invention is disclosed by way of illustrative embodiment, generally designated 10, in FIG. 1 of the accompanying drawings. In this embodiment the apparatus consists of a coating chamber or booth 12 mounted on a base 14 which contains a sump chamber (not shown) for recovery of coating materials falling to the bottom of the coating chamber or booth.

The chamber 12 is provided conventionally in one side wall thereof with an entry port 16 above which is aligned a conveyor port 18. The conveyor port 18 opens into an upper area of the chamber which is shielded off from the remaining portion of the chamber by partitions A converging along the lower ends to permit a conveyor, of chain form or the like, to pass through the chamber suspending articles to be coated therefrom within the lower chamber area. The shielding partitions protect the conveyor against picking up of coating composition directed onto articles suspended therefrom.

By the foregoing structure, generally conventional to flow coat apparatus, articles, such as kitchen cabinets and the like, are moved by a conveyor into the coating chamber through port 16 to a suspended position therein where they are maintained during the coating operation and thence removed by the conveyor system into baking ovens or the like to complete the coating operation.

The chamber 12, of the illustrative embodiment of FIG. 1, is provided with a supply pump 20 which is connected by piping, shown schematically in the drawings, to a source of coating composition, to a source of solvent, and to the recovery sump within the chamber base. The rate of feed supply of composition, solvent, and recovered composition-solvent mixture to the supply pump is regulated by appropriate valving in the piping system, such as 22 and 24, to ultimately supply to the coating nozzles, to be hereinafter described, a composition of the proper consistency to flow at low pump pressures and at an adequate volume to give proper coverage and adhesion in the coating operation to be performed.

Associated with the coating chamber 12 is an elongated feed or flow pipe 26 which extends through one side wall into the coating chamber and which lies perpendicular to and below the path of article travel through the chamber. Within the chamber the pipe 26 is journalled adjacent the inside faces of the opposed walls for axial and rotary movement within said journals, each of which journals is covered by a paint shield 28 to protect the journals from contamination by coating composition. That length of the supply pipe lying between the shielded journals within the chamber is connected centrally, as at 30, to a flexible conduit 32 which, in turn, is connected to piping on the discharge side of the supply pump 20. Those portions of the feed pipe on either side of the flexible tube connection thereto are provided at spaced intervals with unshaped nozzle elements 34 arranged in spaced relationship along the pipe. The nozzles are normally directed, in axial alignment, upwardly of the chamber. In the present embodiment five such nozzles are shown on either side of the flexible conduit coupling to the feed pipe providing 10 nozzles in all within the chamber.

The extended end of the feed pipe 26 outside of the chamber 12 is provided with a piston 36 coupled thereto which is housed within a double acting ram cylinder 38, suitable controls for which (not shown) cause alternate movement or reciprocation of the piston and hence reciprocal movement of the feed pipe longitudinally of its axis.

Intermediate the ram cylinder and the coating chamber the feed pipe passes through a cam housing generally designated at 40. One wall, 42, of the cam housing paralleling the pipe axis is arcuate in configuration and is generally concentric to and spaced from the feed pipe 26. This wall 42 is provided with a cam slot 44 which extends generally diagonally of the wall through the arcuate face thereof. The feed pipe 26 is provided with an extended arm 46 fixed thereto and provided with a cam follower head 48 on the extended end thereof which is slidably or rollably engaged in the cam slot 44 in the wall of the housing.

As is best seen in FIG. 1 of the drawings, the cam slot 44 extends generally diagonally of the cam housing wall 42 in the general direction of the longitudinal axis of the feed pipe 26 and the cam follower 48 is fully movable longitudinally of the slot in either direction of its general diagonal extension.

In the operation of the apparatus hereinbefore described a multi-dimensional article to be coated (not shown) is moved into the chamber above the feed pipe 26 and the generally vertically directed nozzles 34 therein, whereupon coating composition is supplied under low pressure from the supply pump 20 to the feed pipe and nozzles while the feed pipe is axially reciprocated by the double acting ram cylinder 38. As the feed pipe is reciprocated by the ram cylinder it will be rotated simultaneously through a segment of a helix defined by the movement of the cam follower 48 on the rigid arm 46 within the cam slot 44 of the cam housing. Thus, the nozzles will be oscillated in predetermined helixes oblique to the path of article movement through the chamber and which is normally oblique to the multi-dimensions of the article supported from the conveyor.

It has been discovered that with utilization of only ten nozzles, as hereinbefore described, all of the interior and exterior walls of a square or multi-dimensional cabinet may be coated with a coating equivalent to that which would be achieved by no less than one hundred nozzles utilizing prior apparatus and prior methods for application of a low pressure flow coat. Additionally, the extreme low pressure feed of coating composition results in the application of a more uniform coat with a reduction in solvent loss and an elimination of substantially all levelling problems which stem from improper or excess solvent presence.

It is further contemplated that the feed pipe hereinbefore described could be readily recessed in the floor of a coating chamber of the type described to reduce possible damage to the nozzles from articles passed into and out of the chamber without departing from the spirit and concepts of the present invention. It is further contemplated that portable drums may be used as the original source of coating composition as opposed to large fixed tanks because of a reduction in the quantity requirements of the apparatus due to the re-usability of the recovered materials and the very slow feed rate, thereby substantially reducing the piping requirements and facilitating the cleaning and flushing of the component parts preparatory to changing over from one coating material to another.

A modified form of the above described apparatus is shown in FIGS. 3–6. In this modified apparatus a spray chamber 50, adapted to have articles conveyed therethrough as heretofore described, is supported on a framework 52 above and in communication with a collection sump tank 54. Two tubular bearings 56 and 58 are secured in horizontal projection from the inner faces of two opposed walls of spray chamber 50 with the bearings in axial alignment and in registry with opposed openings 60 and 62 in the spray chamber walls.

An elongated spray pipe 64 is rotatably mounted in the bearings 56 and 58 to project outwardly through the chamber walls at each end thereof for a spaced distance therebeyond. The central portion of spray pipe 64 is provided intermediate the bearings 56 and 58 with a plurality of longitudinally spaced and aligned spray nozzles 66 of the same character as those described with respect to the principal embodiment.

Externally of one side wall of the spray chamber the spray pipe is provided with a freely rotatable collar 68 taking the form, generally, of a yoke member and being slidably mounted within an elongated rectangular bar frame 70. Side projecting pins 72 on the collar are slidably engaged in longitudinal slots 74 in the side members of the frame to permit the frame to move vertically relative to the collar.

The ends of the frame 70, top and bottom, are pivotally secured to the ends of crank arms 76 and 78 respectively. The second end of upper crank arm 76 is pivotally secured to the extended end of a bracket 80 fixed to the side wall of the spray chamber 50. The second end of lower crank arm 78 is fixed on the extended end of a horizontal shaft 82 projecting from a gear box 84 through which the shaft has driven connection with a rotary electric motor 86.

The second extended end of spray pipe 64, outside the spray chamber 50, is provided with attachment to a flexible conduit 88 having communication with a source of paint or the like which is maintained under pressure as has heretofore been described. The pipe 64 is additionally provided with a perpendicularly extending pin 90 which projects radially through a slot 92 formed in a longitudinal, helix pattern in an arcuate plate 94 secured by a flange 96 to the side wall of spray chamber 50 above the projecting pipe 64.

In operation of the foregoing apparatus, as articles to be flow coated are conveyed through the spray chamber 50, the spray pipe, under influence of the motor operated cranks acting on the frame 70 and spray pipe collar 68, is reciprocated longitudinally in bearings 56 and 58. As the pipe is reciprocated the influence of pin 90 following in slot 92 causes the pipe to oscillate in a helical pattern within the limits of reciprocation and oscillation of the pipe 64 causes the nozzles 66 to discharge a coating material through a moving helical segment within the chamber in the same manner and with the same results earlier described in respect to the prior embodiment of the apparatus.

Hence, when articles, such as kitchen cabinets or the like, are subjected to the oscillating streams of coating composition the movement of the streams will serve to introduce composition onto and against all interior and exterior surfaces of the articles.

From the foregoing disclosures and descriptions it is seen that a novel method and apparatus have been provided for low pressure flow coating of three dimensional articles which attain all of the objects and advantages hereinbefore expressed and which substantially contribute to improvement of the art and to the attainment of improved results in the art.

What I desire to claim is:

1. Flow coating apparatus including a coating chamber having article support means therein, coating nozzles arranged in said chamber and communicating with a source of coating composition, and means for oscillating each of said nozzles in a pre-selected helix of less than 360° within said chamber.

2. Apparatus as defined in claim 1 wherein said article support means consists of a conveyor extending through said chamber, and the path of the helix defined by nozzle oscillation being oblique to the path of said conveyor through said chamber.

3. Apparatus as defined in claim 1 wherein said nozzles are supported on a coating feed pipe in said chamber, and said pipe is simultaneously reciprocated and oscillated in a path of less than 360° to produce helical nozzle movement.

4. In low pressure flow coat apparatus, the combination of a coating chamber having an article conveyor therethrough; a coating feed pipe reciprocally mounted in and transversely of said chamber, plural nozzles fixed in spaced relationship longitudinally of said pipe, a double acting ram having reciprocating engagement with said pipe, and cam means including a fixed arcuate track of less than 360° and a pipe supported follower engaged in said track acting on said pipe to produce axial partial rotation thereof upon pipe reciprocation.

5. Flow coating apparatus comprising, in combination, a chamber having article support means therein, an elongated tube traversing said chamber and having rotary sliding support therefor, nozzle elements in spaced relationship along an intermediate portion of said tube, a power unit externally of said chamber, means coupling said power unit and said tube to produce reciprocation of said tube transversely of said chamber, and pin means on said tube engaging a helical guide channel of less than 360° supported in fixed relationship to said tube.

6. Flow coating apparatus as defined in claim 5 wherein said helical guide channel is formed in an arcuate plate having a curvature and being positioned concentrically of a portion of the length of said tube.

References Cited by the Examiner
UNITED STATES PATENTS

| | | | |
|---|---|---|---|
| 857,512 | 6/1907 | Baker | 146—52 |
| 1,938,838 | 12/1933 | Jacobson | 239—236 |
| 1,982,763 | 12/1934 | Russell et al. | 118—323 X |
| 2,118,212 | 5/1938 | MacLaurin | 118—323 X |
| 2,726,666 | 12/1955 | Oxford | 239—227 |
| 2,770,216 | 11/1956 | Schock | 118—323 |
| 2,879,180 | 3/1959 | Page et al. | 117—104 X |
| 2,888,111 | 5/1959 | Evans | 74—89 X |
| 3,008,834 | 11/1961 | Wallis | 118—314 X |
| 3,061,446 | 10/1962 | Norman et al. | 118—315 X |

MORRIS KAPLAN, *Primary Examiner.*

RICHARD D. NEVIUS, J. B. SPENCER, CHARLES A. WILLMUTH, *Examiners.*